United States Patent Office 2,724,727
Patented Nov. 22, 1955

2,724,727

BIVANILLYL AND METHOD OF MAKING SAME

Irwin A. Pearl, Appleton, Wis., assignor, by mesne assignments, to Sulphite Products Corporation, Appleton, Wis., a corporation of Wisconsin No Drawing. Application August 8, 1952,
Serial No. 303,408

2 Claims. (Cl. 260—613)

The present invention is directed to the synthesis of a new derivative of the vanillin series, the compound 4,4'-dihydroxy-3,3'-dimethoxybibenzyl. For the purposes of simplicity, this compound will hereinafter be referred to as "bivanillyl." The compound bivanillyl is useful as an intermediate in the preparation of pharmaceuticals and in the synthesis of various other types of organic products. The structural formula for this compound follows:

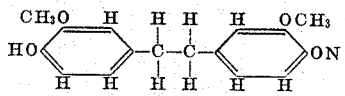

I have now found that bivanillyl can be produced in good yields by the reduction of vanillil with a reducing agent containing zinc when the reduction is carried out in an acidic medium. The compound vanillil (4,4'-dihydroxy-3,3'-dimethoxybenzil) has the formula:

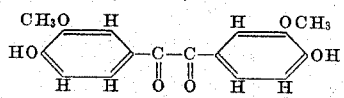

The compound vanillil can be produced from vanillin by the process described in my copending application Serial No. 303,422 filed concurrently herewith.

An object of the present invention is to provide a new derivative of the vanillin series, the compound bivanillyl.

Another object of the invention is to provide a method of reducing vanillil to bivanillyl.

Still another object of the invention is to provide a method for reducing vanillil to bivanillyl by means of a reduction with zinc in an acidic medium.

The following specific examples illustrate the synthesis of bivanillyl by means of a reduction with zinc reducing agents.

Reduction with zinc and hydrochloric acid

A solution of 10 g. of vanillil in 500 cc. of boiling 95% ethanol was treated first with 20 g. of zinc dust and then gradually with 30 cc. of concentrated hydrochloric acid. The colorless mixture was filtered immediately, and the spongy zinc was then extracted with boiling ethanol. The combined filtrate and washings were concentrated to a small volume under reduced pressure on a steam bath. The concentrated solution was diluted with one liter of water, and the resulting white granular precipitate was filtered to yield 9.5 g. of granular crystals of bivanillyl. Recrystallization from methanol yielded fine white needles of bivanillyl which melted at 161–162° C. The compound bivanillyl is strongly fluorescent under ultraviolet light. The ultraviolet absorption spectrum of this compound is characterised by maxima at 282–283 and 323 mmu. and by minima at 252–254 and 223–225 mmu.

Reduction with zinc amalgam and hydrochloric acid

A mixture of 100 g. of zinc dust and 50 g. of mercuric chloride was treated with 250 cc. of water while stirring, resulting in a vigorous reaction. The mixture was stirred for 30 minutes and the liquid was decanted. The resulting amalgam was washed several times by decantation with water and then covered with 400 cc. of ethanol. This mixture was treated with 20 g. of vanillil at room temperature. Concentrated hydrochloric acid was then added dropwise with stirring to the mixture. A reaction commenced, and the mixture became warm. After 140 cc. of hydrochloric acid had been added, white crystals began to separate. The hydrochloride acid addition was then stopped, the mixture was diluted with 200 cc. of ethanol, and heated to boiling. The mixture was filtered at the boiling temperature, and the zinc amalgam residue was then extracted with boiling ethanol. The combined ethanol filtrate and extract was cooled, resulting in the separation of white needle-like crystals. After filtration and washing with cold ethanol, 9.0 g. of bivanillyl crystals melting at 160–161° C. were recovered.

The alcoholic filtrate was concentrated to a small volume and the remaining ethanol was removed by codistillation with water. The residue was diluted with water and filtered, after which it was washed and air dried to yield 10 g. of crude bivanillyl melting at 155–157° C. After recrystallization from ethanol, the melting point of the product was raised to 160–161° C.

From the foregoing, it will be appreciated that the present invention provides a convenient synthesis for the compound bivanillyl in good yields by a reduction of vanillil.

It will be appreciated that various process details can be modified without departing from the scope of the present invention.

I claim:

1. The method of preparing the compound bivanillyl which comprises reducing vanillil with a reducing agent containing zinc in the presence of hydrochloric acid, and recovering the bivanillyl produced.

2. The method of preparing the compound bivanillyl which comprises reducing vanillil with a zinc amalgam in the presence of hydrochloric acid, and recovering the bivanillyl produced.

References Cited in the file of this patent

Beilstein, Band 6, 4th ed. (1923), page 1167.
Pearl, J. Amer. Chem. Soc., vol. 74, pp. 4260–4262, Sept. 5, 1952.